(12) United States Patent
Rosenberg

(10) Patent No.: US 6,391,097 B1
(45) Date of Patent: May 21, 2002

(54) FILTRATION DISC INCLUDING ELECTRIC FIELD FORMATION

(75) Inventor: Gideon Rosenberg, 20 Hana Senesh Street, 36 036 Kiryat Tivon (IL)

(73) Assignees: Gideon Rosenberg, Tivon (IL); Milow Ltd., Charleston, SC (US)

( * ) Notice: Subject to any disclaimer, the term of this patent is extended or adjusted under 35 U.S.C. 154(b) by 0 days.

(21) Appl. No.: 09/594,785

(22) Filed: Jun. 16, 2000

Related U.S. Application Data
(60) Provisional application No. 60/140,037, filed on Jun. 18, 1999.

(30) Foreign Application Priority Data

Jun. 21, 1999 (IL) .................................................. 130574

(51) Int. Cl.[7] ................................................ B03C 3/47
(52) U.S. Cl. ................................ 96/87; 96/88; 210/492; 210/498
(58) Field of Search ........................... 96/69, 72, 84, 96/100, 86–88, 67; 55/332, 333; 210/492, 498, 108, 392

(56) References Cited

U.S. PATENT DOCUMENTS

| | | | | |
|---|---|---|---|---|
| 2,978,066 A | * | 4/1961 | Nodolf ............................ | 96/87 |
| 3,152,988 A | * | 10/1964 | Gutkowski et al. ..... | 210/498 X |
| 3,516,542 A | * | 6/1970 | Jaume ..................... | 210/492 X |
| 4,661,250 A | * | 4/1987 | Rosenberg ............... | 210/498 X |
| 4,740,302 A | * | 4/1988 | Rosenberg ................... | 210/392 |
| 4,793,928 A | * | 12/1988 | Tsukamoto et al. ..... | 210/492 X |
| 5,171,433 A | * | 12/1992 | Rosenberg ................... | 210/108 |
| 5,582,632 A | * | 12/1996 | Nohr et al. ................. | 96/69 X |
| 5,797,978 A | * | 8/1998 | Rosenberg et al. ......... | 96/87 X |

FOREIGN PATENT DOCUMENTS

GB 480810 * 3/1938 ................. 210/492

OTHER PUBLICATIONS

* References Checked Were Cited by Applicant in Specification.*

* cited by examiner

Primary Examiner—Richard L. Chiesa
(74) Attorney, Agent, or Firm—G. E. Ehrlich Ltd.

(57) ABSTRACT

A multiple disc filter includes a plurality of discs arranged in a stack with a face of each disc in contact with a face of the next adjacent disc in the stack. The contacting faces of the discs include surface formations defining small filtering passageways between adjacent discs for filtering a fluid passing between them. The surface formations include a rib array of spaced rib sections integrally formed on a flat surface of one of the contacting faces; and a protrusion array of spaced, discrete protrusions spacing the rib array of the one contacting face from a flat surface of the other contacting face.

20 Claims, 2 Drawing Sheets

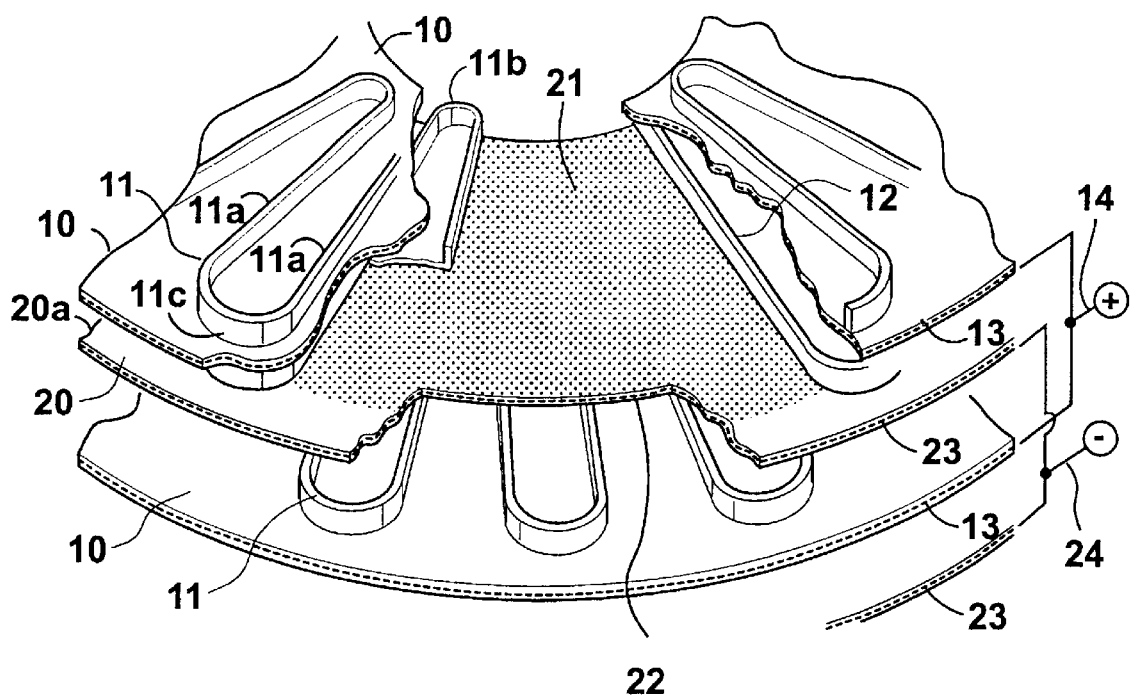
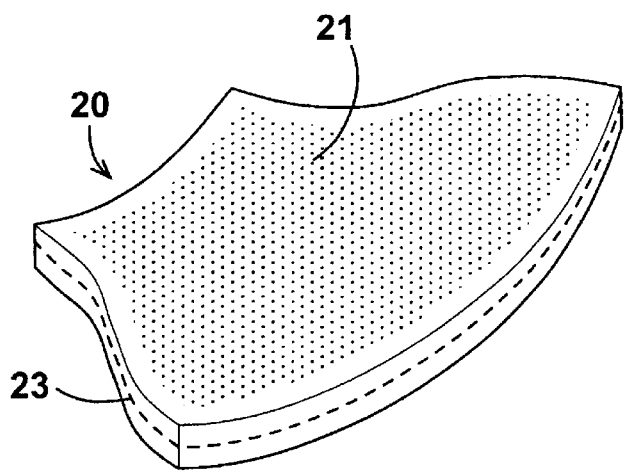
FIG. 1
FIG. 2a
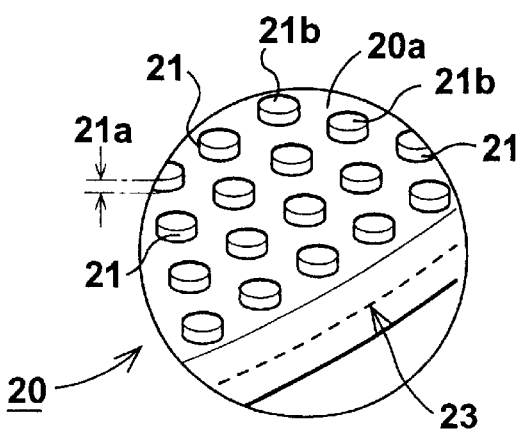
FIG. 2b

FILTRATION DISC INCLUDING ELECTRIC FIELD FORMATION

INCLUDING ELECTRIC FIELD FORMATION

This application claims benefit of Provisions No. 60/140,037 filed Jun. 18, 1999.

FIELD AND BACKGROUND OF THE INVENTION

The present invention relates to disc filters, and in particular, to the disc filters described in U.S. Pat. No. 5,797,978 and 4,661,250, the disclosures of which are hereby incorporated by reference.

U.S. Pat. No. 5,797,978 discloses a filter which includes a plurality of discs arranged in a stack and having ribbed contacting faces defining small filtering passageways between the contacting faces of adjacent discs, similar to the construction described in U.S. Pat. No. 4,661,250. The filter of U.S. Pat. No. 5,797,978, however, is particularly useful as an air filter. For this purpose, each disc has an embedded electrically-conducting (metallic) electrode layer that is connected to a voltage source to generate an electric field in the spaces between each pair of adjacent discs.

The passageways described in U.S. Pat. No. 4,661,250 and 5,797,978 are created by the geometrical pattern formed on the faces of the discs. The preferred embodiments described in those patents are based on a specific pattern having a continuous rib of a sinuous configuration on one side, and a plurality of annular ribs on the other. For filtration of fine dust particles, the height of the annular ribs must be as small as the particle size, of the order of a few microns. The same applies to the distance between the annular ribs. However because of production limitations, it is difficult to make the ribs of a width, and the spacings between ribs, of such a small size. In practice the opening of each passageway is generally of rectangular shape and of the size in one dimension as needed to block particles, but much larger in the other dimension; i.e., the distance between the annular ribs is greater than their protrusion. Moreover, since the practical thickness of the sinuous rib is about 0.5 mm as dictated from structural considerations, the shape of the passageways is more like a tunnel than like a window. This shape, although exhibiting a low resistance to air flow, restricts further reduction of the resistance to flow because of the production limitations mentioned above.

The metallic electrode layer described in U.S. Pat. No. 5,797,978 is continuous and uniform, so that the electric field generated in the spaces between the discs is homogeneous. Such a homogeneous field is effective to attract charged dust particles. In some cases, however, a portion of the dust particles is uncharged (as a result of humidity for example), whereby the efficiency of the field to attract such dust particles is considerably reduced. A gradient electric field would cause uncharged particles to form electric dipoles which would enhance their attraction by the electrical field. Such electric field gradients would be formed when the field is non-homogeneous.

OBJECTS AND BRIEF SUMMARY OF THE INVENTION

An object of the present invention is to provide a filter disc of a novel construction having advantages in the above respects.

A particular object of the present invention is to provide a filter disc with a new geometrical pattern which replaces the annular ribs and allows for further decrease of the filter resistance to air flow when used in a multiple-disc filter. Another object of the invention is to provide a filter disc with an electrically-conducting electrode layer which generates a non-homogeneous field among the discs when used in a multiple-disc air filter, thereby enhancing the attraction of particles in the air.

Some of these advantages can be adapted for very fine filtration of liquids as well as air; and therefore an additional object of the present invention is to provide a disc having advantages in the above respects for the filtration of fuel, oil, water and other liquids.

According to one aspect of the present invention, there is provided a multiple disc filter, comprising: a plurality of discs arranged in a stack with a face of each disc in contact with a face of the next adjacent disc in the stack; the contacting faces of the discs including surface formations defining small filtering passageways between the contacting faces of adjacent discs for filtering a fluid passing between the contacting faces; the surface formations including: a rib array of spaced rib sections integrally formed on a flat surface of one of the contacting faces; and a protrusion array of small, spot-like, discrete protrusions spacing the rib array of the one contacting face from a flat surface of the other contacting face.

According to further features in the described preferred embodiments, the rib sections of the rib array are of equal height and width; and the protrusions of the protrusion array are of substantially smaller height than the height of the ribs, and are of sufficiently small size, and spacing from each other, such that a plurality of the protrusions extend across the width of the rib sections.

In one described embodiment, the rib sections of the rib array are defined by a single rib of sinuous configuration. The discs are of circular configuration, and the spaced sections of the sinuous rib extend radially of the respective disc on which the rib is integrally formed.

Two variations of this embodiment are described. In one variation, the stack includes discs of a first type alternating with discs of a second type; the first type of discs including the rib array on each of its opposite faces; the second type of discs including the protrusion array on each of its opposite faces. In a second variation, the stack includes discs of all the same type, each disc including a rib array on one of its faces, and a protrusion array on the other of its faces.

A further embodiment is described wherein the protrusion array is integrally formed on the outer surface of the rib array of the one contacting face, and is effective to space the rib array from the flat surface formed on the other contacting face. In one variation of this embodiment, the stack includes discs of a first type alternating with discs of a second type; the first type of discs including the rib array and the protrusion array on each of its opposite faces; the second type of discs including flat surfaces on each of its opposite faces. In a second variation of this embodiment, the stack includes discs of all the same type, each disc including a rib array and a protrusion array on one of its faces, and the flat surface on the other of its faces.

The invention is particularly useful in filtration discs including an electrical field formation for removing the solid particles, in which case at least some of the discs are of insulating material and include electrodes mutually-insulated from each other by the insulating material of the discs.

According to another aspect of the present invention, there is provided a multiple disc filter comprising a plurality of discs arranged in a stack with a face of each disc in contact with a face of the next adjacent disc in the stack; the contacting faces of the discs including surface formations defining small filtering passageways between the contacting faces for filtering a air passing between said contacting faces; at least some of the discs being of insulating material and including electrodes mutually-insulated from each other by the insulating material of the discs; alternating electrodes being connected to a first terminal for connection to one side of a voltage source, and the remaining alternating electrodes being connected to a second terminal for connection to the opposite side of the voltage source; each of the electrodes being of planar configuration and being formed with a plurality of closely-spaced gaps bridged by adjacent discs of insulating material and producing gradient electrical fields at the gaps.

The filtration disc may be made without a metallic layer so that no electric field is generated. While this configuration may be limited to filtration of liquids like fuel, oil and water it will be more effective for fine filtration since it provides filtration openings of sizes in the few microns range while the resistance to flow is lower than that in the prior art.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a perspective fragmentary view illustrating a portion of a multiple-disc filter, including the two types of filter discs placed in contact with each other and constructed in accordance with this invention;

FIG. 2a is an enlarged perspective view of a segment of a disc in FIG. 1, having the protrusion array on its faces;

FIG. 2b is a more enlarged section of the protrusion array shown in FIG. 2a illustrating the details of the tiny protrusion spacers;

DESCRIPTION OF PREFERRED EMBODIMENTS

Figure 3:
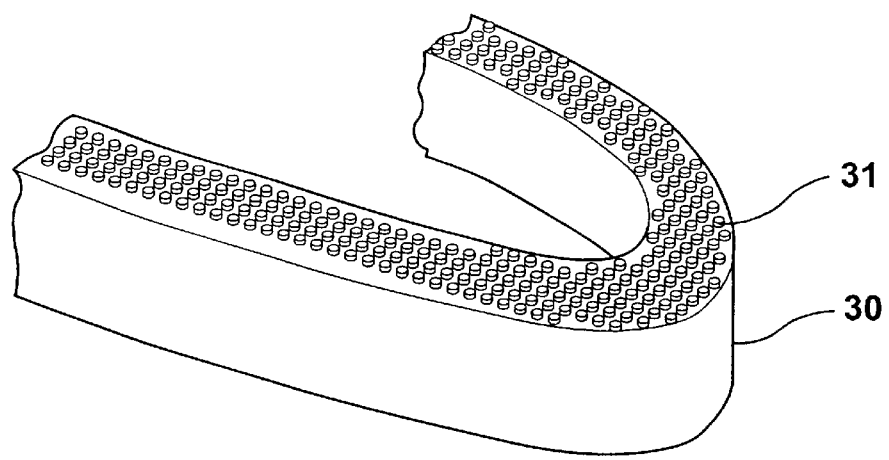
FIG. 3 is an enlarged perspective view of a segment of a sinuous rib integrally formed with an array of tiny protrusions on its face in accordance with another embodiment of the invention.

For purposes of example, the filter discs illustrated in FIG. 1 of the drawings and described herein are similar to the discs described in the above-cited U.S. Pat. Nos. 5,797,978 and 4,661,250, but modified in accordance with the present invention. It will be apparent that these types of discs are described herein only for purposes of example, and that the invention could be advantageously used in many other types of filter constructions.

The invention is described below as embodied in the air filter described in U.S. Pat. No. 5,797,978. Accordingly, the description of the overall construction of the air filter set forth in that patent is hereby incorporated by reference, rather than being repeated herein; and therefore the description below is restricted merely to the construction of the novel discs for use in the multiple disc air filter of that patent.

FIGS. 1, 2a and 2b of the accompanying drawings, illustrate a construction wherein the filter includes two types of discs, generally designated 10 and 20, respectively, to be included in the multiple-disc stack as described in U.S. Pat. No. 5,797,978. Thus, as shown particularly in FIG. 1, disc 10 includes a rib array 11 on one face, and a similar rib array 12 on its opposite face; whereas disc 20 includes a protrusion array 21 on one face, and a similar protrusion array 22 on its opposite face. As shown in FIG. 1, the two types of discs 10, 20 are arranged in the stack so that the rib-carrying discs 10 alternate with the protrusion-carrying discs 20.

As also shown in FIG. 1, the discs 10, 20, are of circular configuration of the same size; and each of the ribs 11, 12 is of a sinuous configuration of uniform height and width projecting from a flat surface (e.g., 10a) on the respective face of its disc 10. Each sinuous rib includes straight, spaced rib sections 11a extending radially of the disc and joined at their opposite ends by an inner bridging section 11b and an outer bridging section 11c. The outer surfaces of the sinuous ribs 11, 12 are flat.

Each of the discs 20 also includes a flat surface (e.g., surface 20a, FIG. 2b) on each of its opposite sides. Each protrusion array 21, 22 includes a plurality of small, spot-like, discrete protrusions projecting from the flat surface (20a) on the respective face of the disc. As shown particularly in FIG. 1, the protrusions (e.g., 21) are of substantially smaller height than the height of the sinuous rib (e.g., 11), and are of sufficiently small size and spacing from each other such that a plurality of such protrusions extend across the width of the rib section facing the protrusions. As shown in FIG. 2b, the protrusions are of pill or cylindrical shape, having a height 21a and a flat outer surface 21b; and the spacing between the protrusions is generally equal to, or at least within the same order of magnitude as, the diameter of the protrusions themselves.

It will thus be seen that when a plurality of the discs 10, 20, are arranged in a stack, with discs 10 alternating with discs 20, the flat outer surfaces (e.g., 21b) of,the protrusions in the two protrusion arrays 21, 22 of each disc 20, are pressed into contact with the flat outer surfaces of the straight sections (e.g., 11a) of the sinuous ribs 11, 12, of each disc 10. These contacting surfaces of the ribs 11, 12 and protrusions 21, 22 thus define small filtering passageways, each having a height equal to the height of the protrusions (e.g., 21a), and a length equal to the distance between adjacent protrusions.

While FIG. 1 illustrates the filter stack as including two types of discs (10, 20), alternating with each other in the stack, it will be appreciated that such a stack could include but a single type of disc, namely one including a rib array of the sinusoidal rib 11 on one face, and a protrusion array of the protrusions 21 on the opposite face of the same disc. Both constructions are described in U.S. Pat. Nos. 5,797,978 and 4,661,250, incorporated herein by reference. Accordingly, when a plurality of such discs are stacked together, the contacting faces of adjacent discs would also include a rib array of one disc in contact with a protuberance array of the adjacent disc, to produce the same filtering passageways between the contacting faces of the discs.

FIG. 3 illustrates a further variation, wherein the protuberance array 31 is integrally formed on the outer face of the rib array 30, rather than on the flat surface (e.g., 20a) of the other disc (e.g., 20). In such case, the other filter disc (corresponding to disc 20 in FIG. 2b) contacting the protuberance array 31 would have a continuous flat surface so that the protuberances in the protuberance array 31 would similarly space the outer surface of the rib array 30 from the flat surface of the adjacent, contacting disc.

It will also be appreciated that the construction of FIG. 3, including the protuberance array 31 formed on the outer face of the rib array 30, could be embodied in a two-type disc filter, in which one type is constructed as shown in FIG. 3 on both faces, and the other type includes merely a flat continuous face in contact with the protuberances 31; or alternatively, in a one-type disc filter, in which one face of each disc is as shown in FIG. 3, and the opposite face of each disc includes the flat continuous surface.

The filter discs 10, 20, shown in FIG. 1 are of plastic insulating material and further include electrodes, shown schematically at 13 and 23, respectively, embedded within the respective discs so as to be mutually insulated from each other. The electrodes of alternate discs are connected to one terminal, as shown, at 14 in FIG. 1, for connection to one side of a voltage source; and the electrodes of the remaining alternate discs 23 are connected to another terminal, as shown at 24, for connection to the opposite side of a voltage source.

Both electrodes 13 and 23 are of the same construction, and of planar configuration. In accordance with a feature of the present invention, both electrodes 13, 23 are formed with a plurality of closely-spaced gaps bridged by adjacent discs of insulating material and producing gradient electrical fields at the gaps.

Figure 4A:
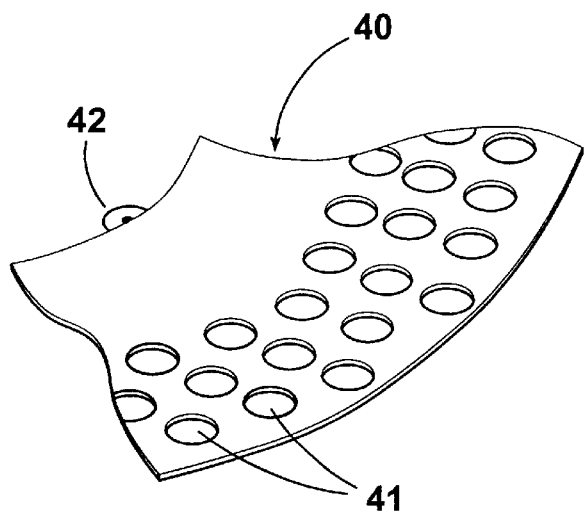
FIGS. 4a and 4b are enlarged views illustrating two examples of the electrically-conductive (metallic) electrode layers made with a plurality of insulating gaps over a portion of the area of each.

FIG. 4a illustrates one construction that may be used, showing the planar electrode 40 and the plurality of closely-spaced insulating gaps 41 of circular configuration, and also showing one terminal 42 at the inner edge of the electrode.

Figure 4B:
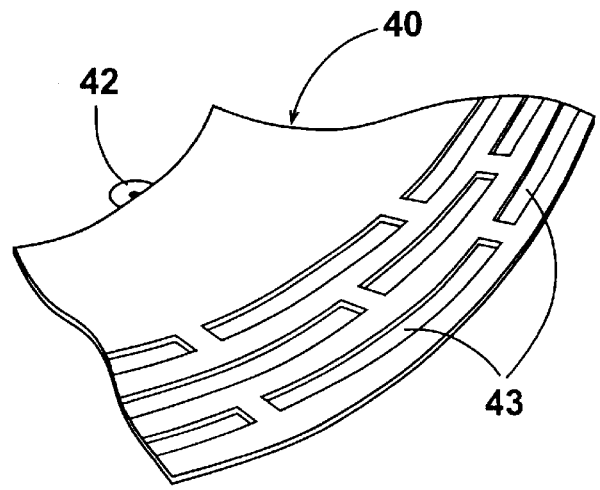

FIG. 4b illustrates a similar electrode 40 but formed with closely-spaced insulating gaps 43 of linear (curvilinear in this case) configuration. In both cases, the insulating gaps produce gradient electrical fields which enhance the attraction of dust particles, particularly the initially uncharged particles, by forming electric dipoles as briefly described above.

While the invention has been described with respect to several preferred embodiments, it will be appreciated that these are set forth merely for purposes of example, and that many other variations, modifications and applications of the invention may be made.

What is claimed is:

1. A multiple disc filter comprising:
a plurality of discs arranged in a stack with a face of each disc in contact with a face of the next adjacent disc in the stack;
the contacting faces of the discs including surface formations defining small filtering passageways between the contacting faces of adjacent discs for filtering a fluid passing between said contacting faces; said surface formations including:
a rib array of spaced rib sections integrally formed on a flat surface of one of said contacting faces;
and a protrusion array of discrete, small, spot protrusions spacing said rib array of said one contacting face from a flat surface of said other contacting face.

2. The filter according to claim 1, wherein said rib sections of the rib array are of equal height and width; and wherein said protrusions of the protrusion array are of substantially smaller height than the height of said rib sections, and are of sufficiently small size, and spacing from each other, such that a plurality of said protrusions extend across the width of said rib sections.

3. The filter according to claim 2, wherein said rib sections of the rib array are joined at their opposite ends to define a single rib of sinuous configuration.

4. The filter according to claim 3, wherein said discs are of circular configuration, and said rib sections of the sinuous rib extend radially of the disc on which the rib array is integrally formed.

5. The filter according to claim 4, wherein said protrusion array is integrally formed on said flat surface of said other contacting face.

6. The filter according to claim 5, wherein the stack includes discs of a first type alternating with discs of a second type;
said first type of discs including said rib array on each of its opposite faces;
said second type of discs including said protrusion array on each of its opposite faces.

7. The filter according to claim 5, wherein said stack includes discs of all the same type, each disc including said rib array on one of its faces, and said protrusion array on the other of its faces.

8. The filter according to claim 1, wherein said protrusion array is integrally formed on the outer surface of said rib array of said one contacting face, and is effective to space said rib array from said flat surface formed on said other contacting face.

9. The filter according to claim 8, wherein the stack includes discs of a first type alternating with discs of a second type;
said first type of discs including said rib array and said protrusion array integrally formed on each of its opposite faces;
said second type of discs including flat surfaces on each of its opposite faces.

10. The filter according to claim 8, wherein the stack includes discs of all the same type, each disc including said rib array and protrusion array integrally formed on one of its faces, and said flat surface on the other of its faces.

11. The filter according to claim 1, wherein at least some of said discs are of insulating material and include electrodes mutually-insulated from each other by the insulating material of said discs.

12. The filter according to claim 11, wherein alternating electrodes are connected to a first terminal for connection to one side of a voltage source; and the remaining alternating electrodes are connected to a second terminal for connection to the opposite side of the voltage source.

13. The filter according to claim 12, wherein each of said electrodes is of planar configuration and is formed with a plurality of gaps bridged by the insulating material of the respective disc and producing gradient electrical fields around the gaps.

14. The filter according to claim 13, wherein said insulating gaps are of circular configuration.

15. The filter according to claim 13, wherein said insulating gaps are of linear configuration.

16. A multiple disc filter, comprising:
a plurality of discs arranged in a stack with a face of each disc in contact with a face of the next adjacent disc in the stack;
the contacting faces of the discs including surface formations defining small filtering passageways between the contacting faces for filtering a fluid passing between said contacting faces;
at least some of said discs being of insulating material and including electrodes mutually-insulated from each other by the insulating material of said discs;
alternating electrodes being connected to a first terminal for connection to one side of a voltage source, and the remaining alternating electrodes being connected to a second terminal for connection to the opposite side of the voltage source; each of said electrodes being of planar configuration and being formed with a plurality of closely-spaced gaps bridged by adjacent discs of insulating material and producing gradient electrical fields at the gaps.

17. The filter according to claim 16, wherein said insulating gaps are of circular configuration.

18. The filter according to claim 16, wherein said insulating gaps are of linear configuration.

19. The filter according to claim 16, wherein said surface formations include a rib array of spaced rib sections integrally formed on a flat surface of one of said contacting faces; and a protrusion array of spaced, discrete protrusions spacing said rib array of said one contacting face from a flat surface of said other contacting face.

20. The filter according to claim 19, wherein said rib sections of the rib array are of equal height and width; and wherein said protrusions of the protrusion array are of substantially smaller height than the height of said rib sections, and are of sufficiently small size, and spacing from each other, such that a plurality of said protrusions extend across the width of said rib sections.

* * * * *